United States Patent [19]

Clougherty et al.

[11] Patent Number: 5,408,467
[45] Date of Patent: Apr. 18, 1995

[54] TRANSMIT-RECEIVE UNIT FOR DIGITAL LOOP CARRIER TRANSMISSION SYSTEMS

[75] Inventors: Mark M. Clougherty, Chatham; Stuart Warmink, Morristown, both of N.J.

[73] Assignee: AT&T Corp., Murray Hill, N.J.

[21] Appl. No.: 892,086

[22] Filed: Jun. 2, 1992

[51] Int. Cl.⁶ .................................... H04Q 11/04
[52] U.S. Cl. ........................... 370/58.1; 370/68
[58] Field of Search ............... 370/110.1, 56, 13, 68, 370/68.1, 111, 58.1, 58.2, 58.3, 66, 16, 84; 371/8.1, 8.2, 11.1, 11.2; 340/825.01, 827; 379/273, 279

[56] References Cited

U.S. PATENT DOCUMENTS

| | | | |
|---|---|---|---|
| 4,394,756 | 7/1983 | Canniff | 370/56 |
| 4,763,316 | 8/1988 | Schaich et al. | 370/16 |
| 4,833,673 | 5/1989 | Chuo et al. | 370/94.1 |
| 5,014,261 | 5/1991 | Shinbashi et al. | 370/16 |
| 5,046,067 | 9/1991 | Kimbrough | 370/56 |
| 5,063,564 | 11/1991 | Crandall et al. | 370/105.1 |

*Primary Examiner*—Douglas W. Olms
*Assistant Examiner*—Ajit Patel
*Attorney, Agent, or Firm*—Lester H. Birnbaum

[57] ABSTRACT

A transmit-receive unit (TRU) which includes interface circuitry for interconnection with another TRU. Interconnect lines can carry PCM data to and from a line interface unit as well as share system information between the two transmit-receive units. An embedded operation channel data path multiplexer (EDP) also permits transmission of data between the transmit-receive unit and a bank controller unit over a service request lead.

14 Claims, 5 Drawing Sheets

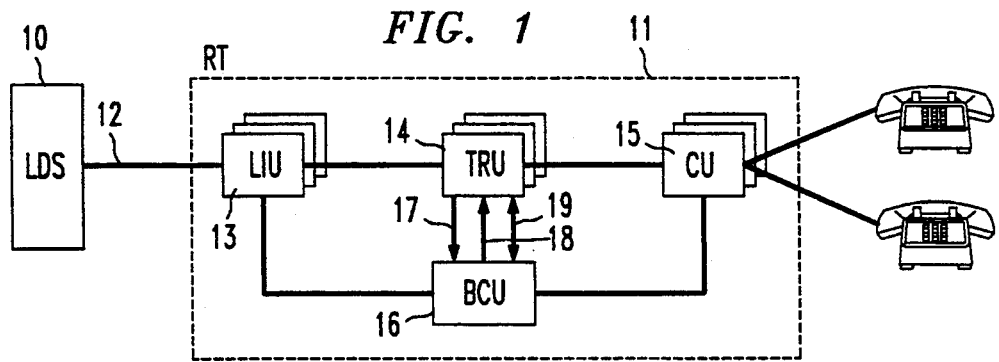
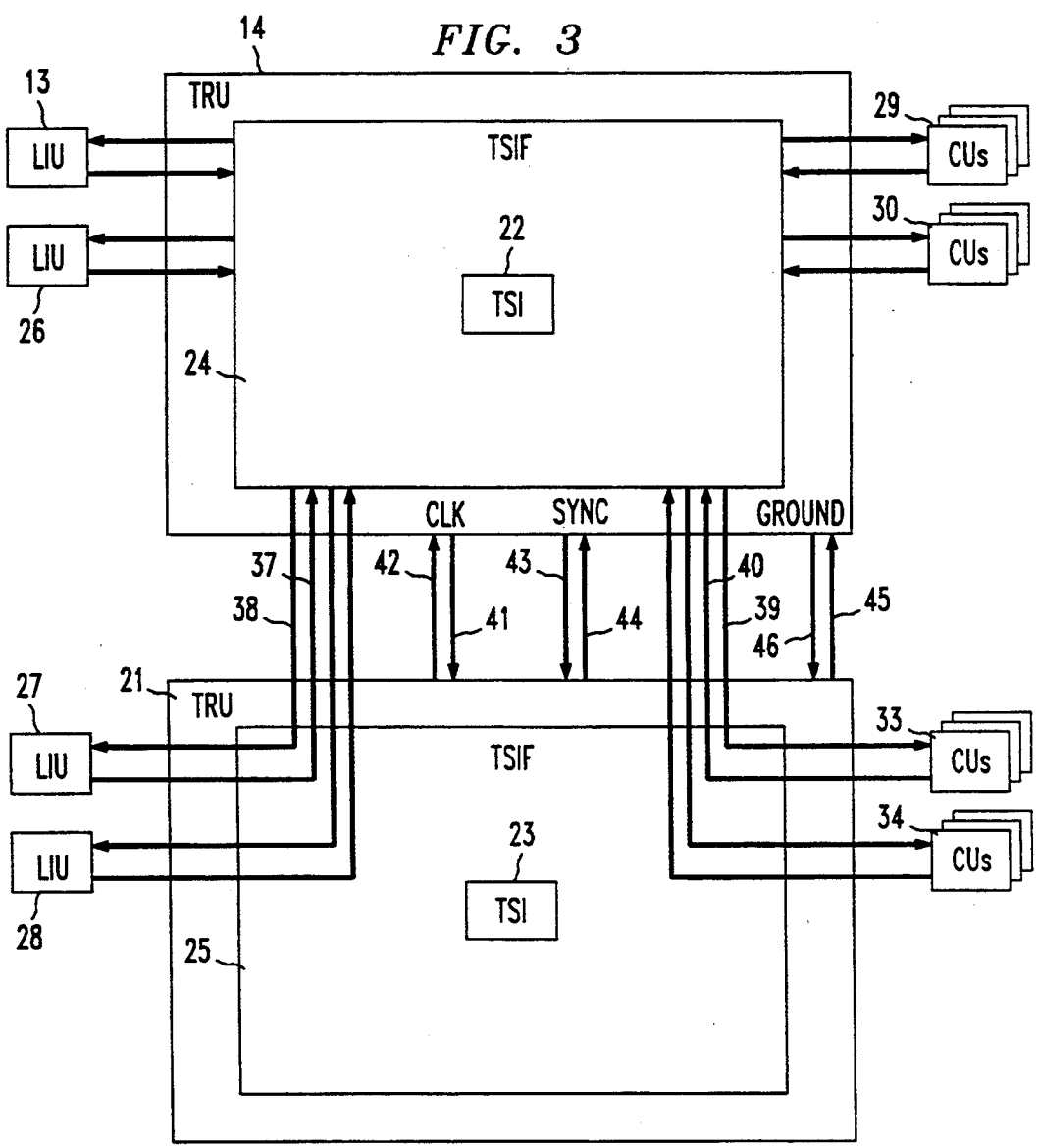

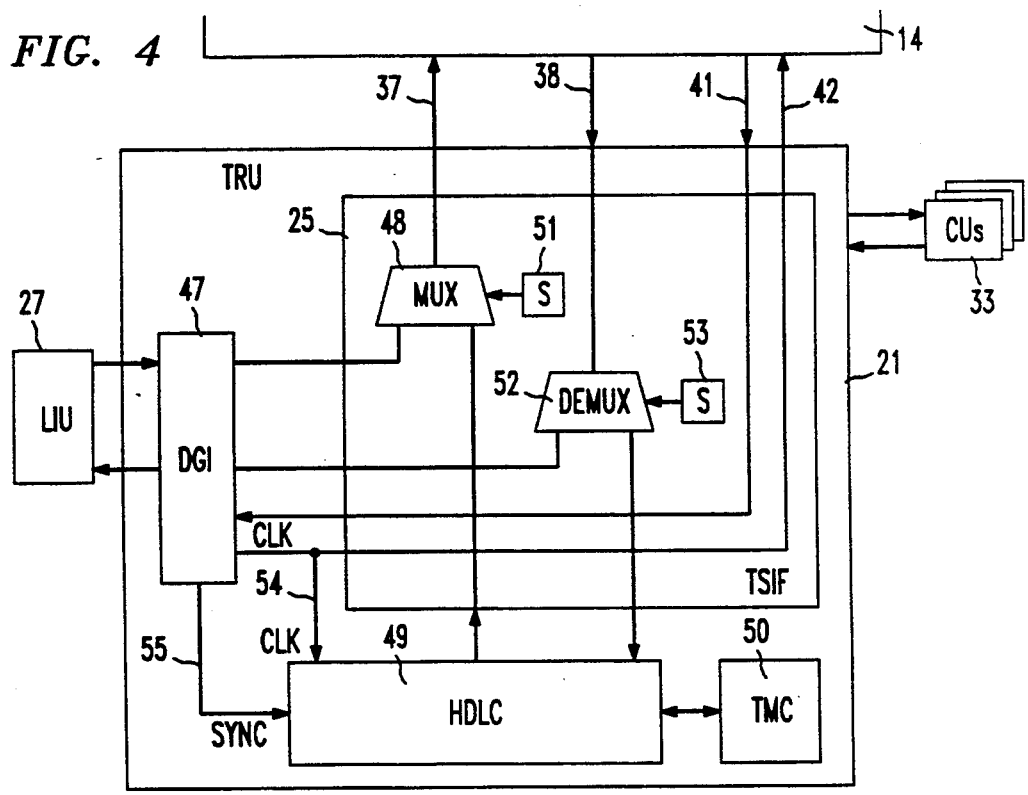
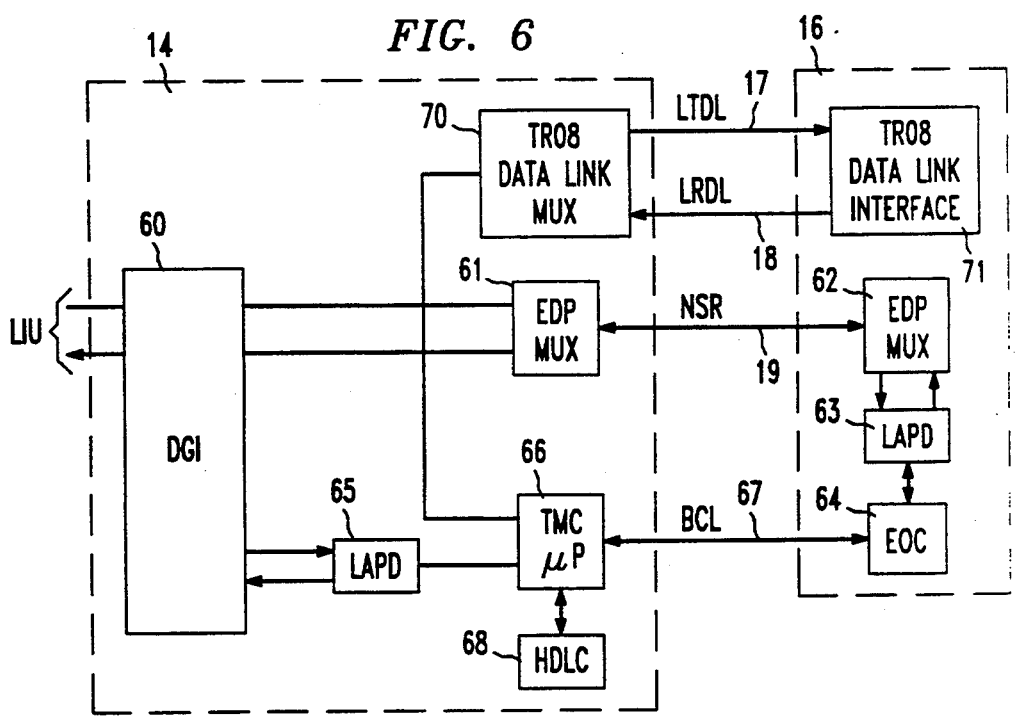

TRANSMIT-RECEIVE UNIT FOR DIGITAL LOOP CARRIER TRANSMISSION SYSTEMS

BACKGROUND OF THE INVENTION

This invention relates to a new transmit-receive unit (TRU) for use in a digital loop carrier transmission system.

In a typical digital loop carrier transmission system, such as the Subscriber Loop Carrier (SLC®) system, as illustrated in FIG. 1, digital transmission takes place over a bidirectional link, 12, between a local digital switch (LDS), 10, and a remote terminal (RT), 11. Within the RT, transmission is received from the LDS by a plurality of line interface units (LIUs), e.g., 13, which convert the time division frame format of the data to something that is compatible with the remainder of the RT circuitry. Each LIU is coupled to a transmit-receive unit (TRU), e.g., 14, which demultiplexes the time division signals received from the LDS for distribution to the channel units (CUs), e.g., 15, which are coupled to the subscribers. In the opposite direction, the TRU will multiplex the signals received from the various CUs. The CUs serve as the interface to the customer and perform such functions as analog/digital conversion. Typically, one to four subscriber lines are coupled to each CU.

A bank controller unit (BCU), 16, controls the operations of the components of the RT. The BCU is typically coupled to the TRU through a pair of data links, 17 and 18, and a service request lead, 19. The service request lead 19 couples the TRU to the BCU so that the TRU can signal the BCU when service is required from the BCU for some reason (e.g., when the TRU is just powered up).

In such systems, it is desirable to increase the concentration of subscriber lines per transmission line to the LDS and to increase the operating speed of the system.

SUMMARY OF THE INVENTION

The invention is a transmit-receive unit for digital loop transmission systems. In accordance with one aspect, the unit includes means for receiving and transmitting multiplexed signals between the unit and a first line interface unit, and means for transmitting and receiving demultiplexed signals between the transmit-receive unit and a first plurality of channel units. The transmit-receive unit also includes means for coupling data between the unit and a second transmit-receive unit.

In accordance with another aspect, the transmit-receive unit includes means for receiving and transmitting multiplexed data signals between the unit and a line interface unit, and means for transmitting to a bank controller unit a request for service signal by the transmit-receive unit. Means are also included for transmitting and receiving over the same link as the service request signal a portion of the data received and transmitted by the line interface unit.

BRIEF DESCRIPTION OF THE DRAWING

These and other features of the invention are delineated in detail in the following description in the drawing:

FIG. 1 is a block diagram of a portion of a typical digital loop carrier transmission system which can utilize the invention;

FIG. 3 is a block diagram of the transmit-receive units illustrating the same feature of the invention;

FIG. 4 is a block diagram illustrating further details of a TRU in accordance with an embodiment of the invention;

FIG. 6 is a block diagram showing additional details of a TRU in accordance with a further embodiment;

DETAILED DESCRIPTION

A typical Subscriber Loop Carder (SLC®) system remote terminal such as illustrated in FIG. 1 includes four digroups of 24 channel units each. Each set of two digroups would be coupled to a different one of a pair of transmit-receive units, and each TRU would, in turn, be coupled to one or two line interface units. Each LIU is capable of transmitting and receiving 24 channels of information. Consequently, present systems are capable of concentrating 48 customer lines onto 24 time slots by coupling each TRU to a single LIU. However, it is desirable to provide further concentration to expand the capacity of the system.

This is accomplished according to one feature of the invention by providing a data link between the two TRUs in the remote terminal so that all channel units coupled to one TRU can be routed through the other TRU and the latter TRU coupled through a single LIU to the local digital switch. This concentrates all 96 customer lines into 24 time slots of the single LIU to provide a 4:1 concentration.

Figure 2:
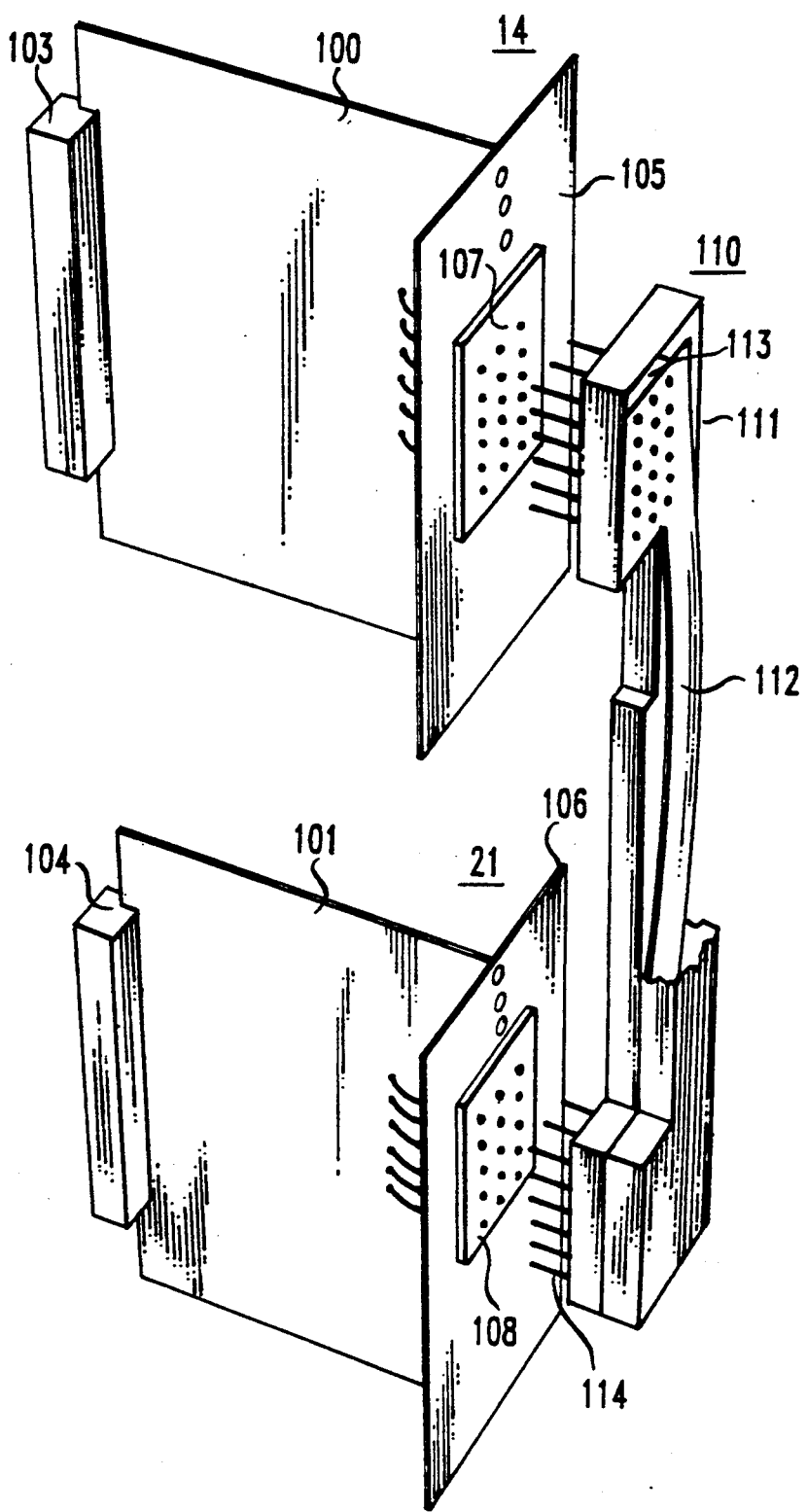
FIG. 2 is a perspective view of a pair of TRUs illustrating a feature of the invention.

FIG. 2 illustrates the electrical connection between the TRUs. Each TRU, 14 and 21, includes a printed circuit board, 100 and 101, respectively, upon which are formed the conductors and components (not shown) which comprise the TRU circuits. The far edge of each circuit board includes an electrical connector, 103 and 104, respectively, which is electrically coupled to a backplane (not shown). The front edge includes a faceplate, 105 and 106, including an opening therein. A socket-type electrical connector, 107 and 108, is mounted on the front edge of the circuit board so that electrical connection is made to the components on the board, and the face of the connector, 107 and 108, protrudes through the aperture in the faceplate, 105 and 106, respectively.

A connector, 110, includes a housing, 111, within which is mounted a flexible printed circuit, 112. In this example, the flexible circuit 112 includes four layers of flexible material with ground layers on the outside layers and signal connectors formed on the interior layers. The two ends of the flexible circuit include a connector, 113 and 114, which is electrically coupled to the signal conductors and ground layers. The connectors, 113 and 114, plug into their associated socket connectors, 107 and 108, to provide the connection between the two TRUs, 14 and 21.

This feature is further illustrated in the block diagram of FIG. 3, where, again, the remote terminal comprises a pair of TRUs, 14 and 21. Each TRU includes a time slot interchanger (TSI), 22 and 23, respectively, and a time slot interchange formatter (TSIF), 24 and 25, respectively, which presents the data in an appropriate format to the TSI. A first pair of LIUs, 13 and 26, is coupled to TRU 14 and a second pair of LIUs, 27 and 28, is coupled to TRU 21. A first plurality of channel unit digroups, 29-30, is coupled to TRU 14 while a second plurality of channel unit digroups, 33-34, is coupled to TRU 21. In this example, there are 2 digroups for each TRU, with each digroup comprising 12 channel units. It will be appreciated that these numbers can be varied depending on the system.

In accordance with a feature of the invention, the TSI 23 of TRU 21 is rendered inactive, and the LIUs and CUs which would normally be coupled thereto are re-routed by TSIF 25 of TRU 21 to the TSIF 24 of TRU 14. Thus, for example, TSIF 24 will receive data from LIU 27 on line 37 and transmit data to LIU 27 on line 38, which lines couple together the two TRUs. Similarly, channel unit digroup 33, for example, will receive data from TSIF 24 on line 39 and transmit data to the TSIF on line 40, which lines also couple together the two TRUs, 14 and 21. Also provided between the TRUs are a pair of lines 41 and 42 for exchanging clock signals, and lines 43 and 44 for exchanging synchronization signals so that the clocks of the two TRUs can be locked to each other. Desirably, lines 45 and 46 are also provided between the TRUs to couple ground signals and thereby reduce noise.

It will be appreciated, therefore, that providing interconnection between the TRUs permits all CUs, 29-30, 33-34, to be coupled through a single LIU, e.g., 13, to the local digital switch. Also, if the "active" TSI 22 should fail, the TSI 23 of the other TRU 21 can be activated and signals routed thereto.

In addition to sending PCM signals between LIUs and CUs, the two TRUs are capable of sharing system information over the same interconnection lines. This feature is illustrated in the block diagram of FIG. 4 where elements also shown in FIG. 3 are similarly numbered. An LIU e.g., 27, is coupled to the TRU, e.g., 21, through a digroup interface (DGI) circuit, 47, whose primary function is to strip off data from the incoming time slots for ultimate transmission to the appropriate CU, e.g., 33, and, in the reverse direction, to combine the signals from the CUs for transmission to the LDS. The DGI also transmits and receives clock signals between the TRU and LIUs.

In the particular portion shown in FIG. 4, the DGI will transmit the incoming PCM data to a multiplexer, 48, in the TSIF 25 which multiplexer also receives signals from a high level data link controller (HDLC), 49. The HDLC, which is also a part of the TRU21, will receive data from the main processor, 50, on the TRU, also known as the time slot management channel (TMC) processor. The HDLC will also receive clock and synchronization signals from the DGI on lines 54 and 55, respectively.

Figure 5:
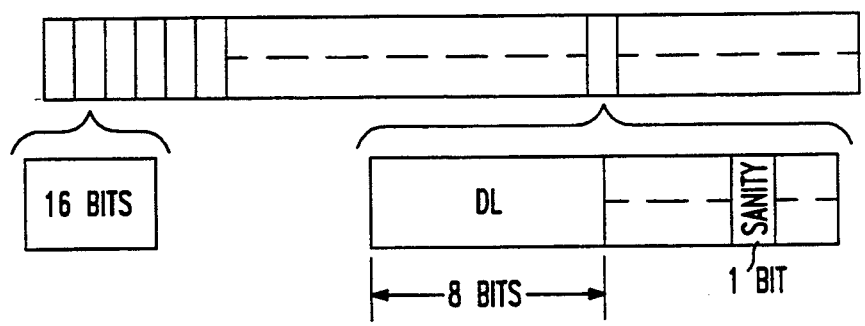
FIG. 5 is a diagram of a frame of data in accordance with the same embodiment.

A bit selector, 51, controls whether PCM data from the DGI or system data from the HDLC will be transmitted over the interconnection line 37 between TRU 21 and TRU 14. The data will be transmitted in accordance with the frame pattern shown in FIG. 5, which illustrates a typical frame of 32 time slots, each slot including 16 bits. In the typical SLC ® system, these are a plurality of null time slots where no data is transmitted. In one of these previously null time slots, e.g., time slot 20, the system information is transmitted in the form of 8 bits of data designated DL (for data link). This system information can be, for example, information related to TRU provisioning. At another portion of the same time slot a single "sanity" bit is transmitted. When this bit is set, i.e., equal to "1", it indicates to the receiving TRU that it should take over the function of the timing master for the two TRUs.

Returning to FIG. 4, in the reverse direction, TRU 14 can send data over line 38 which includes PCM data and system information data in accordance with the same pattern. This data is sent to demultiplexer 52, which is controlled by bit selector 53, both of which are part of the TSIF 25. The demultiplexer will control whether PCM data is sent to the LIU 27, or whether system information is sent to the HDLC 49 and then on to the TMC 50.

It will also be noted that the DGI 47 transmits clock signals through TSIF 25 to TRU 14 on line 42, and also receives clock signals through TSIF 25 from TRU 14 on line 41. This transmission ensures that the two TRUs are operating at the same timing.

FIG. 6 illustrates in more detail some of the components of the TRU 14 and the BCU, 16 of FIG. 1. Since the TRUs 14 and 21 are essentially identical, this figure shows only TRU 14. It will also be noted that the TSI and TSIF shown in FIG. 2 have been omitted here for the sake of clarity in the illustration.

Data from the local digital switch through the LIUs (e.g., 13 of FIG. 2) is received by a digroup interface (DGI), 60, similar to the DGI, 47 of FIG. 4, contained in the TRU 21. The DGI will strip off data from the appropriate time slot which is intended for the BCU 16 and send it to an embedded operation channel data path multiplexer (EDP Mux), 61, which will be described in more detail below. The EDP Mux will transmit the data to a similar EDP Mux, 62, at the BCU over the service request lead (NSR) 19. This data will be transmitted in the BCU via a data link controller, 63, which contains the link access protocol on the D channel (LAPD), to the main processor, 64, for the embedded operation channel (EOC).

The DGI 60 on the TRU will also strip off data from another time slot and transmit the data to a data ink controller, 65. This data will be transmitted to the main processor, 66, on the TRU, also known as the time slot management channel (TMC) processor. The main processor will also transmit status and maintenance information to the main processor, 64, on the BCU, via the bank controller link 67. TRU maintenance information will, thereby, be transmitted over this bank controller link while the RT system information will be transmitted over the NSR link 19.

Interconnection between the two TRUs, as previously described, is handled by a high level data link controller (HDLC), 68, which is coupled to the HDLC, 49 of FIG. 4, of the other TRU, 21 of FIG. 4. The HDLC would, typically, be part of the data link processor, 65, but the two are shown as separate blocks for purposes of illustration.

For systems employing a TR08 standard for interfacing with the local digital switch, RT system information data is also sent from one of the TRUs (14) to the BCU 16, by means of a TR08 data link multiplexer, 70, which is controlled by the TMC microprocessor, 66. This data, typically, would include alarm and testing information. The data is transmitted over line 17 to a TR08 data link interface, 71, at the BCU, and received by the TRU from the interface, 71, on the line 18. It should be noted that since all alarm and testing information is transmitted and received by TRU 14 in TR08 systems, no TR08 data link is required in the TRU 21 of FIG. 4. Also, for newer systems employing the TR303 interface to the local digital switch, all RT alarm and maintenance information data can be sent over the service request lead 19, and the need for lines 17 and 18 is eliminated.

Figure 7:
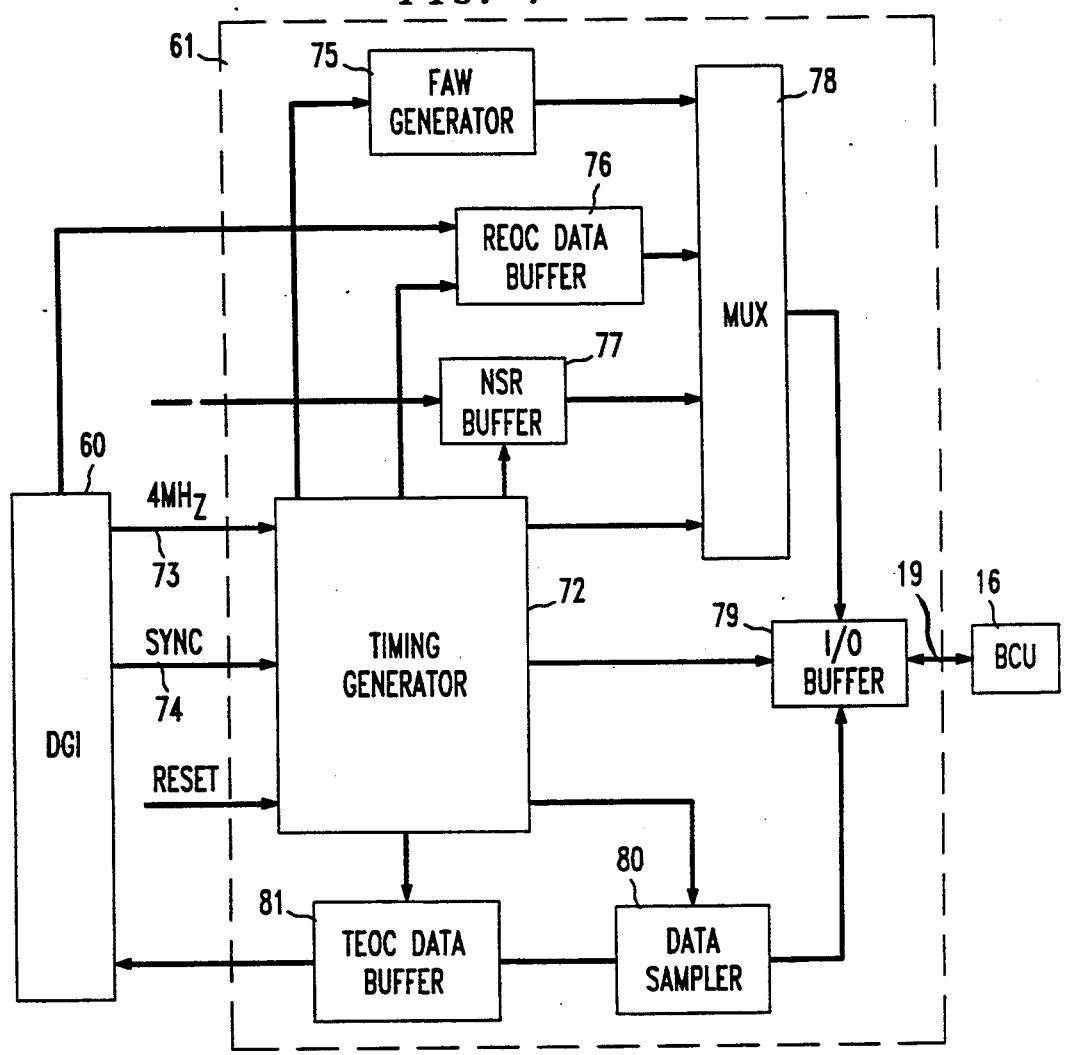
FIG. 7 is a block diagram of a further portion of the TRU of FIG. 6 in accordance with the same embodiment.
Figure 8:
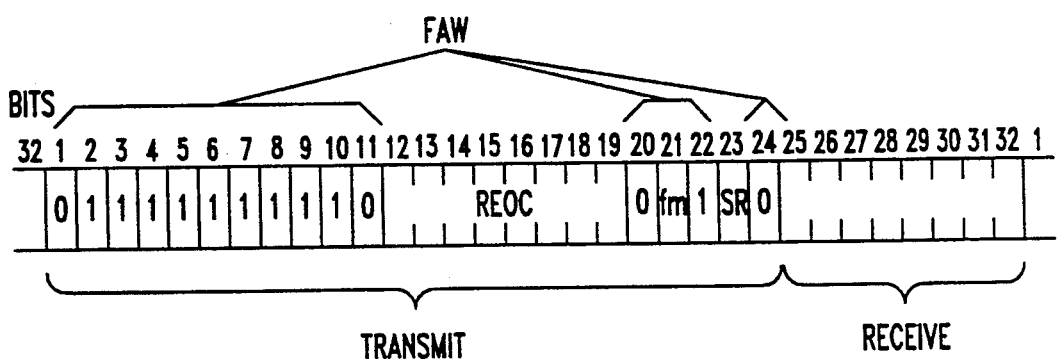
FIGS. 8 and 9 are diagrams of data frames transmitted and received by a TRU and a BCU, respectively, in accordance with the same embodiment.
Figure 9:
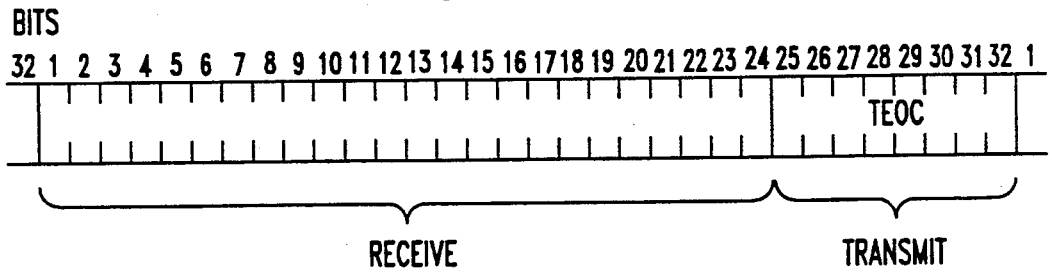

FIG. 7 illustrates in block form further details of the EDP Mux (61 of FIG. 6), while FIGS. 8 and 9 illustrate the frame format for data transmission between the TRU and BCU. A timing generator, 72, in the EDP receives a 4 MHz clock and a synchronization signal from the DGI 60 on leads 73 and 74, respectively. The generator creates a 256 kHz clock signal which is derived from the 4 MHz signal. The timing generator drives the frame alignment word (FAW) generator, 75, the receive embedded operation channel (REOC) data buffer, 76, and the service request (NSR) buffer, 77.

At the start of each frame, as indicated by the timing generator, 72, the FAW generator, 75, will be activated. As illustrated in FIG. 8, the frame alignment word (FAW) will occupy the first 11 bit positions in the frame which will be transmitted by the TRU. In this example, the first portion of the frame alignment word includes a "0" followed by nine "1s " and then another "0". This pattern is chosen since it cannot be duplicated anywhere else in the frame and, therefore, cannot be mistaken with the data portion of the frame. This data is transmitted to a multiplexer, 78.

At the 12 through 19 bit positions, the timing generator, 72, will drive the REOC data buffer, 76, which receives data from the local digital switch through the DGI 60. This data, labeled "REOC", will also be transferred to multiplexer, 78.

At bit positions 20 through 22, the FAW generator, 75, will again be activated to produce a "0", fm bit, and "1" in succession. The fm bit is a frame bit which indicates which group of registers (0-3 or 4-7) of data is being sent over links 17 and 18 in synchronization with the data in this frame. These bits will also be transmitted to the multiplexer, 78. By distributing the FAW throughout the frame, the maximum number of contiguous ones or zeros can be kept to a minimum to prevent confusion with the data. Also, distributing the FAW throughout the frame guarantees a sufficient number of transitions so the BCU maintains synchronization with the data.

At bit position 23, the NSR buffer, 77, is activated to transmit a service request bit (SR) to the multiplexer, 78. Finally, at bit position 24, the FAW generator is again activated to produce the final bit (0) of the FAW which is transmitted to the multiplexer, 78. This final bit prevents the possibility of producing nine contiguous "1s" in combination with the data transmitted by the BCU (TEOC of FIG. 9).

The multiplexer, 78, time division multiplexes the signals from the FAW generator, REOC data buffer and NSR buffer to produce the pattern of FIG. 8, which is transmitted to the I/O buffer 79 and on to the BCU over lead 19.

As illustrated in FIG. 9, the BCU will receive the bits sent by the TRU frame of FIG. 8 during bit positions 1→24. At bit positions 25→32, the BCU will transmit information labeled "TEOC" in FIG. 9, and the TRU will receive the information.

Returning to FIG. 7, at bit positions 25→32, the timing generator, 72, will drive the I/O buffer 79 so that it is convened to a receive buffer for the data from the BCU. The data is sampled by data sampler, 80, and put into the TEOC data buffer, 81. The data is then transmitted to the DGI 60 and onto the local digital switch. Thus, the EDP Mux 61 permits system information to be exchanged between the TRU and BCU over the service request lead 19.

Various modifications of the invention will become apparent to those skilled in the art. All such variations which basically rely on the teachings through which the invention has advanced the art are properly considered within the scope of the invention.

We claim:

1. A first transmit-receive unit for digital loop carrier transmission systems comprising:

means for receiving and transmitting multiplexed signals between said first transmit-receive unit and a first line interface unit;

means for transmitting and receiving signals which are not multiplexed between said first transmit-receive unit and a first plurality of channel units; and means for coupling data between said first transmit-receive unit and a second transmit-receive unit having similar receiving and transmitting means such that multiplexed signals between the second transmit-receive unit and a second line interface unit, and signals which are not multiplexed between the second transmit-receive unit and a second plurality of channel units, can be received and transmitted by the said first transmit-receive unit, and such that signals between the first and second plurality of channel units and the first transmit-receive unit can be transmitted and received over said first line interface unit.

2. The first transmit-receive unit according to claim 1 wherein the unit comprises a printed circuit board with a faceplate at one edge and the means for coupling data comprises an electrical connector at the edge including the faceplate.

3. The first transmit-receive unit according to claim 1 wherein the means for coupling data comprises a data link controller which transmits system data to the second transmit-receive unit.

4. The first transmit-receive unit according to claim 3 further comprising means coupled to the data link controller for multiplexing system data onto the same link between units as carries the multiplexed signals from one of the line interface units between the first and second transmit-receive units.

5. The first transmit-receive unit according to claim 1 further comprising means coupled to a digroup interface circuit for transmitting and receiving clock signals between said transmit-receive unit and the second transmit-receive unit.

6. The first transmit-receive unit according to claim 5 further comprising means coupled to said first transmit-receive unit for transmitting and receiving synchronization signals between said transmit-receive unit and the second transmit-receive unit.

7. The first transmit-receive unit according to claim 1 wherein the means for coupling data comprises separate data links for each line interface unit coupled to each transmit-receive unit.

8. The first transmit-receive unit according to claim 7 further comprising data links for transferring clock signals between the transmit-receive units which data links are separate from the data links for each line interface unit, and data links for transferring synchronization signals between the transmit-receive units which data links are separate from the data links for each line interface unit and from the data links for transferring clock signals.

9. A transmit-receive unit for digital loop carrier transmission systems comprising:

- means for receiving and transmitting multiplexed data signals between said transmit-receive unit and a line interface unit;
- means, including a lead, coupled to the receiving and transmitting multiplexed data signal means for transmitting to a bank controller unit a signal which requests service for said transmit-receive unit from the bank controller unit; and
- means coupled to the receiving and transmitting multiplexed data signal means for also transmitting to the bank controller unit over the said lead a portion of the data signals received by the transmit-receive unit from the line interface unit and for producing a frame alignment word for transmission with said data signals so that the bank controller unit is synchronized with said data signals.

10. The unit according to claim 9 wherein said means for transmitting a portion of the data signals further comprises a timing generator coupled to said means for producing a frame alignment word.

11. The unit according to claim 10 wherein the means for transmitting a portion of the data signals further comprises a data buffer for receiving said portion of the data signals from the line interface unit, said buffer being coupled to the timing generator.

12. The unit according to claim 11 wherein the means for transmitting a portion of the data signals further comprises a multiplexer for combining the outputs of the means for producing the frame alignment word and the buffer.

13. The unit according to claim 12 wherein the output of the multiplexer comprises a frame of bits where the frame alignment word is distributed in a noncontiguous manner through the frame.

14. The unit according to claim 9 wherein the means for transmitting a portion of the data signals further comprises means for receiving additional data signals over the said lead from the bank controller unit.

* * * * *